Dec. 28, 1948.　　　　A. R. WYNN　　　　2,457,193
ELECTRODE HOLDER
Filed Aug. 29, 1945　　　　　　　　　　　　2 Sheets-Sheet 1
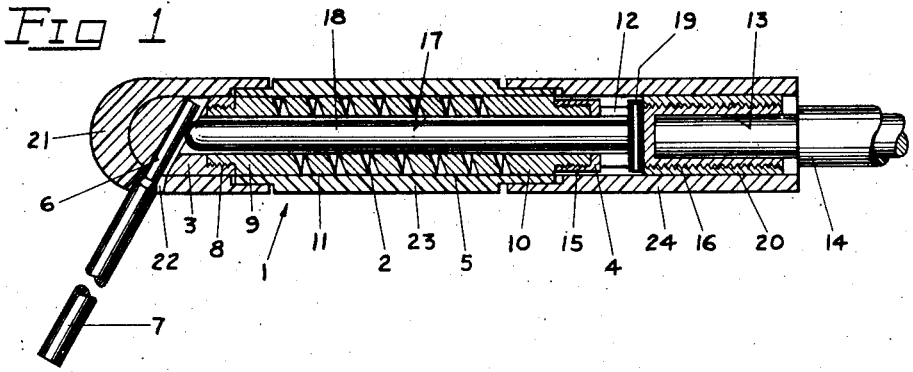
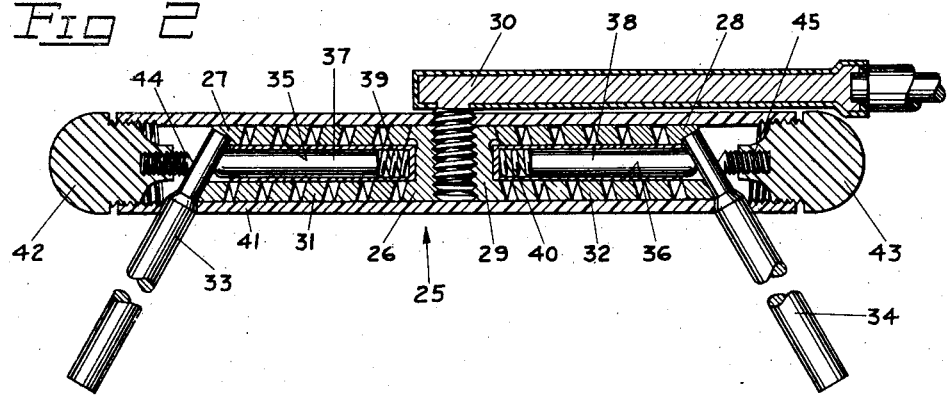
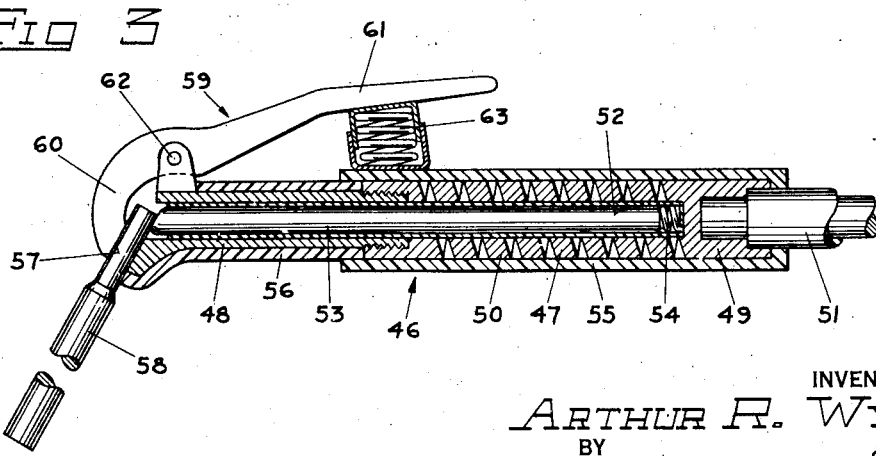
INVENTOR
ARTHUR R. WYNN
BY
Ralph L Chappell
ATTORNEY Dec. 28, 1948.　　　　A. R. WYNN　　　　2,457,193
ELECTRODE HOLDER
Filed Aug. 29, 1945　　　　　　　　　　　　　2 Sheets-Sheet 2

INVENTOR
ARTHUR R. WYNN
BY
[signature]
ATTORNEY

Patented Dec. 28, 1948

2,457,193

UNITED STATES PATENT OFFICE 2,457,193

ELECTRODE HOLDER

Arthur R. Wynn, Long Beach, Calif.

Application August 29, 1945, Serial No. 613,407

14 Claims. (Cl. 219—8)

(Granted under the act of March 3, 1883, as amended April 30, 1928; 370 O. G. 757)

This invention relates to electrode holders and more particularly to electrode holders of the type used to support welding electrodes and to transmit electric current thereto in arc welding operations.

Direct current electric arc welding is frequently hampered by a phenomenon known as "arc blow," which causes molten welding metal to be thrown or splattered from joints being welded. This phenomenon is commonly believed to be caused by magnetic fields present or induced in the materials. According to this theory plates to be welded in abutting relationship may have magnetic poles of like polarity adjacent the space in which it is desired to place the molten welding metal. Such arrangement of poles tends to repel the molten metal with the result that it is thrown out of the space where it is needed to form a weld.

Heretofore a number of methods have been developed for overcoming the phenomenon of arc blow. Many of the methods previously employed have involved the use of electro-magnets placed in locations around the joint to be welded in such fashion as to balance or neutralize the magnetic fields present. Such methods may overcome arc blow to some extent, but they are undesirably awkward, since they require the use of cumbersome supplementary equipment. Another method is to employ alternating current arc welding, which involves the creation of undesirable hazards for the operator, since it is more dangerous to use than direct current.

Objects of the present invention are to provide improved electrode holders which overcome arc blow in direct current arc welding by the use of means embodied in the holders without the use of supplementary equipment; to provide improved electrode holders in which the necessity for moveable parts in the electric circuits is eliminated; and to provide improved electrode holders having the foregoing advantageous features and which are adapted to be used with otherwise standard equipment.

It is a further object of the invention to provide for carrying out the foregoing objects in a facile, economical, and efficient manner.

In accomplishing these and other objects of the present invention, I have provided improved details of structure, the preferred forms of which are illustrated in the accompanying drawings, wherein:

Fig. 1 is a longitudinal sectional view of an electrode holder embodying the features of my invention.

Fig. 2 is a longitudinal sectional view of a modified form of electrode holder embodying the features of my invention.

Fig. 3 is a longitudinal sectional view of a further modified form of electrode holder embodying the features of my invention.

Figure 4:
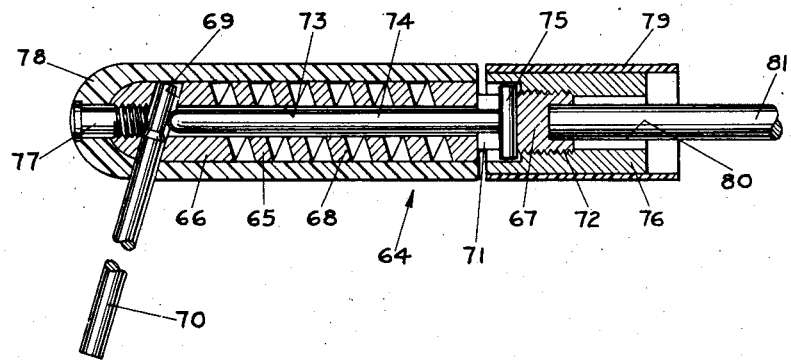
Fig. 4 is a longitudinal sectional view of a still further modified form of electrode holder embodying the features of my invention.

Referring more in detail to the drawings:

In Fig. 1 I have shown an embodiment of electrode holder designated generally as 1. The holder 1 comprises a body 2 of electrical conducting material, preferably copper, made up of three removably connected portions, namely, a head portion 3, a rearward portion 4, and a solenoid portion 5. The head portion 3 has a transverse aperture 6 extending substantially therethrough to receive a welding electrode 7 which is ordinarily of ferrous material and may be of standard design. The head portion 3 is removably secured to the solenoid portion 5 as by the threaded engagement at 8. The solenoid portion 5 has end sections 9 and 10 connected by a coil 11 and is preferably formed as an integral casting of copper or other material that is a good conductor of electricity. The coil 11 preferably has a plurality of turns and may be cast or otherwise formed with the turns thereof advancing in either direction. The rearward portion 4 of the body 2 has an axially elongated diametric slot 12 therethrough and a longitudinal bore 13 in the rearward end to receive a lead or connection 14 from a source of electric current of welding intensity. The rearward portion 4 is removably secured to the solenoid portion 5 as by the threaded engagement at 15. The rearward section of the rearward portion 4 carries external screw threads 16.

A longitudinal bore 17 extends through the body 2 from the diametric slot 12 in the rearward portion 4 through the solenoid portion 5 into the transverse aperture 6 in head portion 3. Fitted within the longitudinal bore 17 is a core 18 formed of magnetic material, normally iron or steel. The outer peripheral surface of the core 18 carries a layer of insulating material to insulate the core from the body 2.

A pin 19 is slidably fitted within the diametric slot 12 and is electrically insulated from the body 1. The ends of the pin protrude from the sides of the rearward portion 4 and the central portion of the pin 19 abuts against the adjacent rearward end of the core 18.

The opposite or forward end of the core 18 is adapted to abut against a peripheral face of the electrode 7 to secure the electrode within the aperture 6 and in electrical contact with the surface thereof. A sleeve 20 is threaded upon the threads 16 of the rearward portion 4 of the body for longitudinal adjustment thereon. The forward end of the sleeve 20 is adapted to abut against the protruding ends of the pin 19 to push the latter forward in the slot 12 against the rearward end of the core 18 to move the forward end of the core into tight engagement with the electrode 7.

The body 2 has a covering of insulating material therearound preferably of a suitable plastic composition. The head portion 3 has a section of insulating material 21 around its outer face that has an aperture 22 therethrough in registry with the aperture 6 in the head portion. The solenoid portion 5 has a section of insulating material 23 around its outer face and the sleeve 20 has a section of insulating material 24 around its outer face that extends over the outer face of the rearward portion 4 of the body and over the rearward end of the solenoid portion 5. The sections of the covering may be secured to the appropriate elements by suitable means or they may be cast permanently on these elements.

Operation

A welding operation may be carried out using electrode holders of my invention with conventional techniques.

Electric current is conducted from the lead 14 to the electrode 7 through the solenoid portion 5 of the body 2. The current in the solenoid portion sets up a magnetic field in the core 18, but does not transmit electric current thereinto since the latter has a peripheral covering of insulating material. Magnetic poles would normally appear at the respective ends of the core 18, but, since the forward end of the core is in contact with the ferrous electrode 7, the latter becomes a magnet and a pole is located at the lower end thereof where it normally functions to neutralize the magnetic field of the plates being welded and thereby prevents arc blow.

It may happen that the polarity of the pole set up at the tip of the electrode 7 is the same as the polarity of the poles in the plates adjacent the joint. In this case it may be necessary to reverse the polarity of the magnetic pole formed at the tip of the electrode and such reversal may be accomplished either by reversing the direction of flow of the welding current or by replacing the solenoid portion 5 of the body 2 with a solenoid portion having turns advancing in the opposite direction. Either of these procedures reverses the polarity of the pole formed at the tip of the electrode and renders the pole effective to neutralize the field of the plates.

In this form of my invention electric current is conducted to the electrode entirely through the body 2. The only relatively movable parts in the body 2 are at the threaded engagements 8 and 16. The portions of the body are joined tightly at these threaded engagements and hence for practical purposes these engagements may be regarded as immovable. There are thus no movable parts in the welding circuit that may become burned or otherwise damaged by extraneous arcing of the high amperage welding current.

Modifications

In Fig. 2 I have shown a modified embodiment of electrode holder, designated generally as 25, which operates on principles similar to those of the electrode holder 1, but supports a plurality of electrodes.

The electrode holder 25 comprises a body 26 made up of a pair of head portions 27 and 28, one of which is located at each end of the body, a central portion 29, adapted to receive a connection or lead 30 from a source of electric current of welding intensity, and pair of solenoid portions 31 and 32. The head portions 27 and 28 have transverse recesses in their outer faces adapted to receive electrodes 33 and 34, which may be similar in construction to the electrode 7. The electrical connection to the central portion 29 is preferably threadedly engaged therein. The solenoid portions 31 and 32 connect the central portion 29 with the head portions 27 and 28 and conduct current to the head portions. The turns of the solenoid portions 31 and 32 may advance in either direction as desired. Preferably the entire body 26 is made integral as a single casting of copper or other material that is a good electrical conductor.

The body 26 has a pair of longitudinal bores 35 and 36 extending in either direction from the central portion 29, through the solenoid portions 31 and 32, and emerging from the head portions 27 and 28 into the transverse recesses therein. A pair of cores 37 and 38 are fitted into the bores 35 and 36 and may be similar in construction to the core 18, preferably being of ferrous material covered by a layer of insulating material.

A pair of springs 39 and 40 are fitted into the bores 35 and 36 behind the cores 37 and 38 and are preferably in the form of helical compression springs electrically insulated from the body 26. The springs 39 and 40 bear against the rearward ends of the cores 37 and 38 and tend to force the cores outwardly from the central portion 29 of the body.

The body 26 is preferably covered with a shell of insulating material 41, preferably of a suitable plastic composition. The latter has a pair of apertures in registry with the transverse recesses in the head portions 27 and 28, respectively, through which the electrodes 33 and 34 may pass. The insulating material 41 may either be secured to the body 26 by appropriate means or it may be cast thereon.

A pair of plugs 42 and 43 are threadedly engaged in the ends of the covering 41 and carry plunger elements 44 and 45. The latter are coöperable with the forward ends of the cores 37 and 38 to secure the electrodes 33 and 34 in electrical contact with the head portions 27 and 28 respectively of the body 26.

The operation of an electrode holder of the type shown in Fig. 2 is substantially similar to that of the type shown in Fig. 1, except that the holder may be used in welding a pair of joints simultaneously. If the magnetic poles formed at the ends of the electrodes 33 and 34 are of the wrong polarity to neutralize the fields present in the material, the polarity may be reversed by reversing the direction of current flow through the holder or by substituting a different holder of similar design, but oppositely wound.

In Fig. 3 I have shown a further modified embodiment of electrode holder, designated generally as 46, that also operates on principles similar to those already explained.

The electrode holder 46 comprises a body 47 made up of a head portion 48, a rearward portion 49, and a solenoid portion 50. Preferably the head portion 48 is elongated and threadedly secured to the solenoid portion 50 and the rearward portion 49 is made integral with the solenoid portion, the solenoid portion and the rearward portion preferably being formed as an integral casting of copper. The rearward portion 49 is adapted to receive a connection or lead 51 from a source of electric current of welding intensity.

The body 47 has a longitudinal bore 52 that extends from the rearward portion 49, through the solenoid portion 50, and through the head portion 48. A core 53 and a helical compression spring 54 are received within the bore 52, the construction and arrangement of these elements being similar to those of the corresponding elements of the electrode holder 25, shown in Fig. 2 and hereinbefore described.

The rearward portion 49 and the solenoid portion 50 of the body 47 are surrounded by a covering 55 of insulating material preferably of suitable plastic composition. The forward portion 53 of the body is surrounded by a covering 56, also preferably of a suitable plastic composition, and adapted at its rearward end to fit within the forward end of the covering 55. The covering 56 has an opening 57 at its forward end to receive an electrode 58 and a securing element 59 therefor.

The securing element 59 comprises a jaw portion 60 and a handle portion 61 and is pivoted to a lug 62 preferably formed integrally on the forward portion 48 of the body 47. The jaw portion 60 is cooperable with forward end of the core 53 to secure the electrode 58 in electrical contact with the body 47. A helical compression spring 63 is provided and bears against the peripheral face of the covering 55 and the under face of the handle 61 to force the jaw 60 into clamping engagement on the electrode 58.

The operation of an electrode holder of the type shown in Fig. 3 is substantially similar to that of the type shown in Fig. 1, except for the means provided for securing the electrode therein. In an electrode holder of the type shown in Fig. 3, to release the electrode or to engage another one, it is merely necessary to depress the handle 61 against the force of the spring 63. The polarity of the magnetic pole produced at the tip of the electrode 58 may be reversed if necessary by reversing the direction of flow of current or by providing a holder having a solenoid portion with turns advancing in the opposite direction.

In Fig. 4 I have shown a still further modified form of electrode holder, designated generally as 64, that also is designed and operates on principles similar to those already explained.

The electrode holder 64 comprises a body 65, made up of a head portion 66, a rearward portion 67, and a solenoid portion 68, all formed integrally, preferably as a casting of copper. The head portion 66 has a transverse aperture 69 adapted to receive an electrode 70. The rearward portion 67 has an axially elongated diametric slot 71 and carries external screw threads 72. The body contains a longitudinal bore 73 that extends from the diametric slot 71 through the solenoid portion 68, the head portion 66, where it intersects the transverse aperture 69, and through the forward end of the body.

A core 74, substantially similar in construction to the cores employed in the embodiments already described, is fitted within the bore 73. A pin 75 is slidably fitted within the diametric slot 71 and a sleeve 76 is engaged with the screw threads 72, the structure and relation to the core being substantially similar to those of the corresponding elements of the electrode holder 1, Fig. 1. The electrode 70 is secured within the transverse aperture in electrical contact with the body by engagement with the forward end of the core 74.

The forward end of the bore 73 is closed by a plug 77 preferably threadedly engaged within the bore. The purpose of the extension of the bore through the forward end of the body is to provide an access opening for insertion of the core 74 into the bore.

The body is surrounded by a covering of insulating material 78, preferably of a suitable plastic composition. The sleeve 76 is surrounded by a covering 79, preferably also of suitable plastic material.

The rearward portion 67 of the body 65 has a longitudinal bore 80 adapted to receive a connection or lead 81 from a source of electric current of welding intensity.

Figure 5:
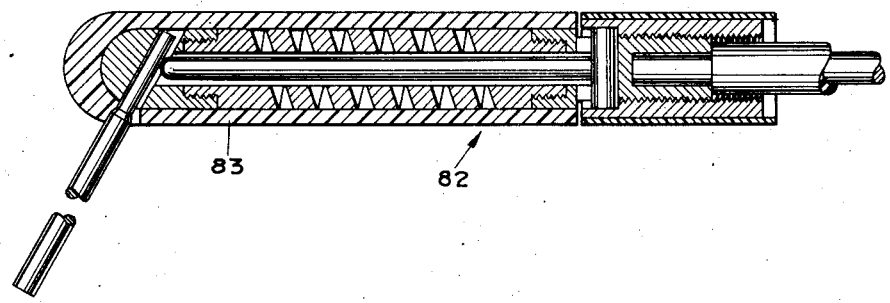
Fig. 5 is a longitudinal sectional view of another modified form of electrode holder embodying the features of my invention.

In Fig. 5 I have shown another modified form of electrode holder, designated generally as 82, which is substantially similar in construction and operation to the electrode holder 1, Fig. 1, except that the covering of insulating material over the head portion and solenoid portion of the body is formed as an integral piece, designated 83.

Figure 6:
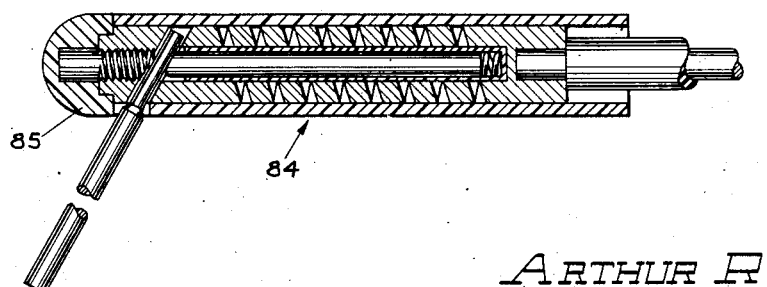
Fig. 6 is a longitudinal sectional view of still another modified form of electrode holder embodying the features of my invention.

In Fig. 6 I have shown still another modified form of electrode holder, designated generally as 84, which is substantially similar in construction to the electrode holder 25, Fig. 2, except that it is designed to support only a single electrode. In Fig. 6 I have shown a plug 85 corresponding to the plug 42 or 43, Fig. 2, as threadedly engaged with the body instead of with the covering as in Fig. 2. It is apparent, however, that the two types of engagements of the plugs are mechanical equivalents and that either may be employed in either form.

While I have shown but certain embodiments of my invention, it is susceptible to further modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon on therefor.

I claim:

1. In an electrode holder, a body of electrical conducting material comprising a head portion having a transverse aperture adapted to receive an electrode, a solenoid portion, and a rear portion adapted to be connected to a source of electric current of welding intensity and having an elongated diametric slot, said portions of the body having a longitudinal bore extending from the diametric slot in the rear portion through the solenoid portion and into the transverse aperture in the head portion, a core of magnetic material within said longitudinal bore and being electrically insulated from said body, a pin within said diametric slot adapted to abut again an end of said core, and means adjustably secured on the rear portion of said body and engageable with said pin to force the opposite end of said core into engagement with an electrode in said transverse aperture to secure the electrode therein.

2. In an electrode holder, a body of electrical conducting material having portions adjacent the ends adapted to contact electrodes, a central portion adapted to be connected to a source of electric current of welding intensity, and a pair of solenoids connecting said central portion and said first named portions, said solenoids being wound in opposite directions, a pair of cores of magnetic material within said solenoid portions and being electrically insulated therefrom, and securing members cooperable with said cores to secure a pair of electrodes in electrical contact with said body.

3. In an electrode holder, a body of electrical conducting material having a portion adapted to contact an electrode, a portion adapted to be connected to a source of electric current of welding intensity, and a solenoid portion connecting said first named portion and second named portion, a core of magnetic material in said solenoid portion and being electrically insulated therefrom, means on said electrode contacting portion for securing an electrode in electrical contact with said body, and a spring disposed to bias said core against the electrode.

4. In an electrode holder, a body of electrical conducting material having a portion adapted to contact an electrode, a portion adapted to be connected to a source of electric current of welding intensity, and a solenoid portion connecting said first named portion and said second named portion, a core of magnetic material in said solenoid portion and being electrically insulated therefrom, spring means bearing against an end of said core and against said body and urging said core against an electrode in said body, a lever pivoted to said body and having a portion adapted to cooperate with the opposite end of said core to secure an electrode in electrical contact with said body, and spring means bearing against said body and said lever.

5. An electrode holder comprising a holding tip for receiving an electrode, a solenoid connected to said tip, a core mounted within said solenoid for axial, non-rotating movement, and means for non-rotatably urging said core against an electrode in said tip.

6. An electrode holder comprising an electrically conducting holding tip for receiving an electrode, a solenoid connected to said tip for applying current to the electrode, a core mounted within said solenoid for axial, non-rotating movement, a sheath of electrical insulation in the space between said core and said solenoid, and means for non-rotatably urging said core against an electrode in said tip.

7. An electrode holder comprising a body adapted to receive an electrical conductor at one end and having a transverse opening at the other end for receiving an electrode, a core member mounted on said body and extending to said opening, spring means for biasing said core member against the electrode, and securing means engageable with the electrode diametrically of said core to secure the electrode against said body.

8. An electrode holder comprising a body adapted to receive an electrical conductor at one end and having a transverse opening at the other end for receiving an electrode, a core member mounted on said body and extending to said opening, spring means for biasing said core member against the electrode, and a spring biased lever pivoted to said body and engageable with the electrode diametrically of said core to secure the electrode against said body.

9. An electrode holder comprising an elongate body having a longitudinal channel therein, a core mounted for axial, non-rotary movement within said channel, a transverse opening in said body communicating with said channel and adapted to receive an electrode, said body including a solenoid circumjacent said core and connected electrically to a portion of said body adjacent said opening, whereby current flows through said solenoid and through the electrode in series, and a spring urging said core against an electrode in said opening.

10. An electrode holder comprising an elongate body having a longitudinal channel therein, a core mounted for axial, non-rotary movement within said channel, a transverse opening in said body communicating with said channel and adapted to receive an electrode, said body including a solenoid circumjacent said core and connected electrically to a portion of said body adjacent said opening, whereby current flows through said solenoid and through the electrode in series, a spring urging said core against an electrode in said opening, and an insulating sheath in the space between said core and said solenoid.

11. An electrode holder comprising an elongate body having a transverse opening near one end thereof for receiving an electrode, securing means adapted to hold an electrode firmly in said body against a wall of said opening, a longitudinal channel in said body communicating with said opening, a core disposed in said channel for axial movement, and spring means urging said core against an electrode secured in said opening.

12. An electrode holder comprising an elongate body having a transverse opening near one end thereof for receiving an electrode, a wall of said opening being of electrically conducting material, securing means adapted to hold an electrode firmly in said body against said wall, a longitudinal channel in said body communicating with said opening, a core disposed in said channel for axial movement, said body including a solenoid circumjacent said core and connected electrically to said wall, whereby current flows through said solenoid and through the electrode in series, and spring means urging said core against an electrode secured in said opening.

13. An electrode holder comprising an elongate body having a transverse opening near one end thereof for receiving an electrode, a wall of said opening being of electrically conducting material, securing means adapted to hold an electrode firmly in said body against said wall, a longitudinal channel in said body communicating with said opening, a core disposed in said channel for axial, non-rotary movement, said body including a solenoid circumjacent said core and connected electrically to said wall, whereby current flows through said solenoid and through the electrode in series, an insulating sheath in the space between said core and said solenoid, and spring means urging said core against an electrode secured in said opening.

14. An electrode holder comprising a solenoid, a tip connected to one end of said solenoid, an electrical contact member formed integral with the other end of said solenoid and adapted to receive an electrical lead wire, a transverse opening in said tip adapted to receive an electrode, a core disposed axially within said solenoid having a diameter almost as large as the inside diameter of said solenoid, a sheath of insulating material between said core and said solenoid, and a spring biasing said core toward said tip.

ARTHUR R. WYNN.

REFERENCES CITED

The following references are of record in the file of this patent:

UNITED STATES PATENTS

| Number | Name | Date |
|---|---|---|
| 507,419 | Coffin | Oct. 24, 1893 |
| 1,561,055 | Callahan | Mar. 10, 1925 |
| 2,131,861 | Smith | Oct. 4, 1938 |
| 2,325,926 | Weed | Aug. 3, 1943 |
| 2,357,663 | Klingenberg | Sept. 5, 1944 |
| 2,412,022 | Whitmore | Dec. 3, 1946 |

FOREIGN PATENTS

| Number | Country | Date |
|---|---|---|
| 241,023 | Great Britain | Oct. 15, 1925 |
| 365,804 | Germany | Dec. 22, 1922 |
| 798,623 | France | Mar. 10, 1936 |